United States Patent Office 3,425,908
Patented Feb. 4, 1969

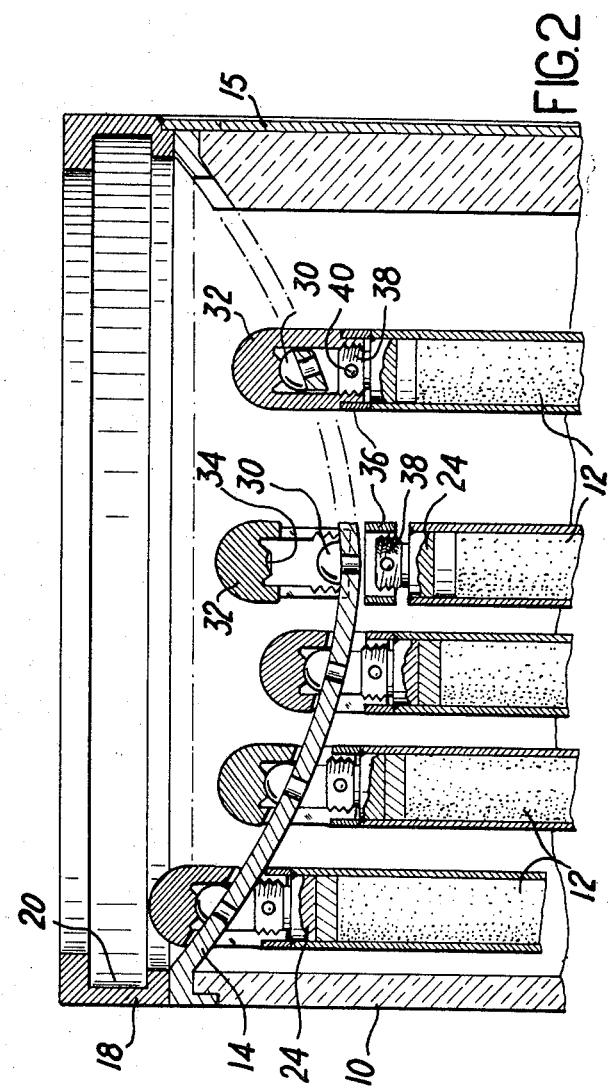

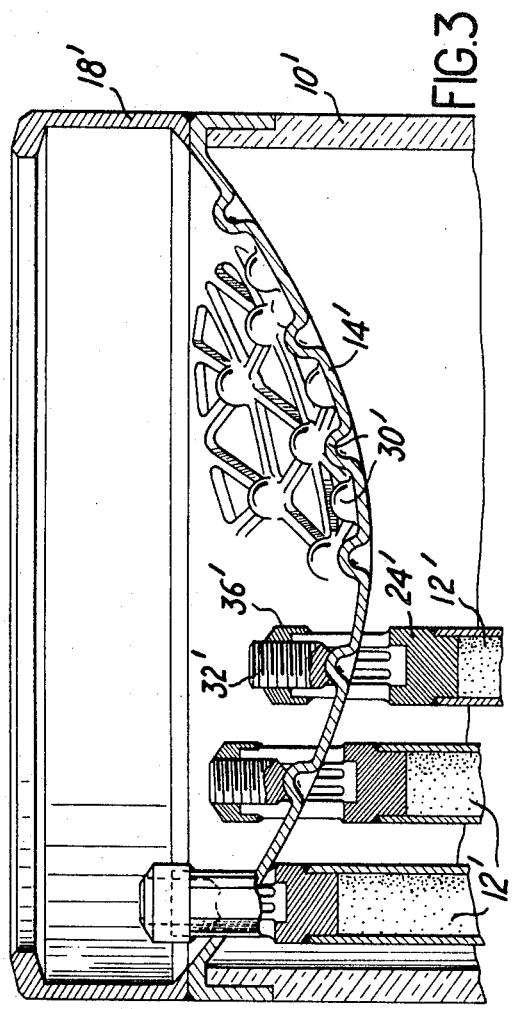

3,425,908
NUCLEAR FUEL ASSEMBLY
Pierre Rouge, Orsay, Michel Roze, Paris, and Jean Vivien, Les Clayes-sous-Bois, France, assignors to Commissariat à l'Energie Atomique, Paris, France
Filed Nov. 13, 1967, Ser. No. 682,167
Claims priority, application France, Dec. 12, 1966, 87,131
U.S. Cl. 176—78
Int. Cl. G21c 3/34
12 Claims

ABSTRACT OF THE DISCLOSURE

The fuel element, for use in vertical position, comprises a bundle of fuel pins, a grid which supports the pins and spacers between the pins. The grid is of paraboloidal shape and the pins have a ball and socket connection therewith.

---

The present invention relates to a nuclear fuel assembly and more especially to a cluster-type assembly which is constituted by a plurality of elongated fuel elements or so-called pencils consisting of canned fuel material and held together in bundles.

In known fuel assemblies of this type, the fuel pencils are maintained in parallel relation by means of a series of support grids and braces which tie the fuel pencils both at the ends and in the intermediate zones. Another known type of fuel assembly employed in vertical-channel reactors also deserves special mention. This assembly comprises a top support grid from which the fuel pencils and braces are suspended in such a manner as to permit free expansion of the fuel pencils while maintaining these latter in spaced relation both at the lower end and in intermediate zones. It has been proposed in particular to fabricate the support grids from an alloy having a low neutron-capture cross-section such as a zirconium-base alloy. In addition, flat support grids have been employed up to the present time, mainly for reasons related to convenience of machining. However, such grids have to be of substantial thickness and therefore of substantial weight in order to withstand the shearing stresses and bending moments to which they are subjected.

This invention is directed to the design concept of fuel assemblies which meet practical requirements more effectively than those which have been proposed heretofore, especially insofar as they comprise a fuel-pencil support grid having a shape which is conducive to optimum utilization of the material from which the grid is fabricated.

To this end, the invention proposed a cluster-type fuel assembly for vertical-channel reactors and comprising a bundle of canned fuel pencils, a grid for supporting one of the terminal portions of said fuel pencils and at least one brace for maintaining said fuel pencils in spaced relation, said fuel assembly being primarily characterized in that the support grid has the general shape of a paraboloid of revolution, the axis of which coincides with the axis of the fuel assembly.

The term "grid" as employed in the foregoing definition and in the following description must be understood to refer not only to a single-piece mechanical component but also to an assembly of wires disposed on a lattice, pastilles or rings designed to retain the fuel pencils being located on the nodes of said lattice: this second solution will be primarily suitable when the stresses applied on the grid are not too high.

The invention further consists in other arrangements which can advantageously be employed in conjunction with the preceding but which can also be employed independently. A better understanding of the invention will be gained by perusal of the following description of forms of execution which are given by way of non-limitative example, reference being made to the accompanying drawings, in which:

FIG. 2 is a view in elevation of the top portion of the fuel assembly of FIG. 1, this view being taken in cross-section along the vertical mid-plane of the assembly;

Figure 1:
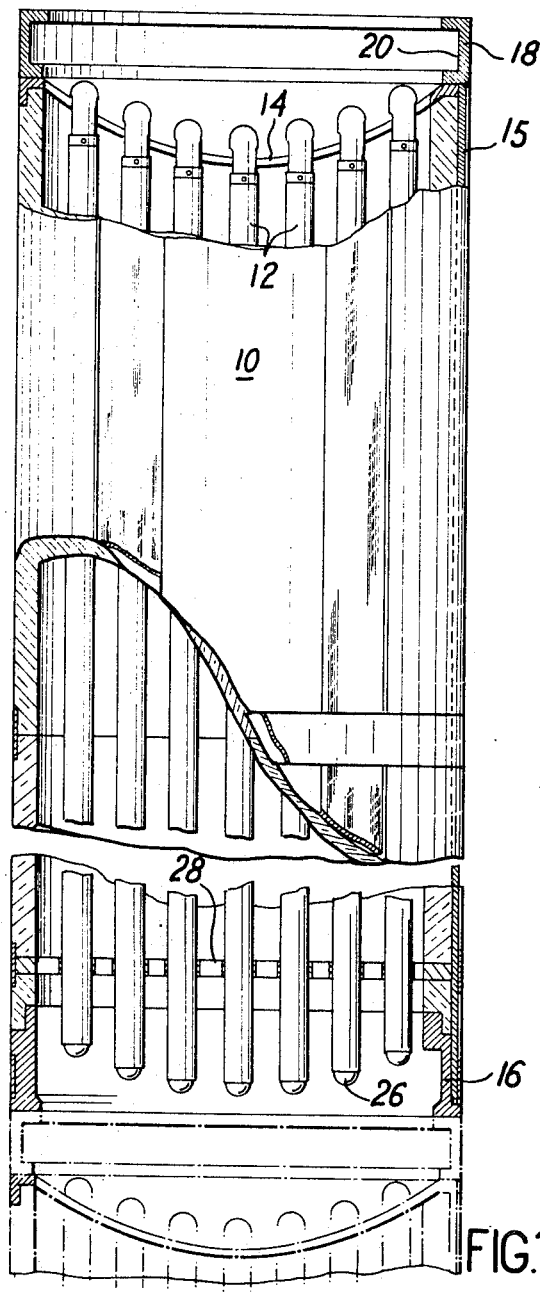
FIG. 1 is a view in elevation showing a fuel assembly in accordance with the invention, a portion of the sleeve surrounding the assembly having been broken away.

FIG. 3, which is similar to FIG. 2, shows an alternative form of execution of the invention.

The fuel assembly which is shown in FIGS. 1 and 2 comprises a graphite sleeve 10 which surrounds a bundle of fuel pencils such as the pencil 12, said bundle being suspended from a grid 14. Inasmuch as this fuel assembly is of substantial length (1.5 meter, for example), the graphite sleeve is divided in the vertical direction into a number of sections which are maintained in contact with each other by means of tie-rods 15. Said tie-rods are fixed by any suitable means (e.g. by welding) to a bottom retaining ring 16 and to a top retaining ring 18. The bottom section of the graphite sleeve bears on the retaining ring 16, whilst the top retaining ring rests on the grid 14 and this latter in turn covers the top section of the graphite sleeve 10. There is formed in the top retaining ring 18 an annular recess 20 which is intended to afford a hold for a fuel handling gripper.

The fuel pencils 12 are constituted (as shown in FIG. 2) by a stack of ceramic fuel pellets enclosed in a leak-tight sheath or can 22 which is sealed by a top end plug 24 (as shown in FIG. 2) and a bottom end plug 26 (as shown in FIG. 1). Said fuel pencils can be composed of one or a number of sections. In the latter case, each section is closed at both ends by means of end plugs; adjacent end plugs are provided with means such as a screw-thread for coupling sections to each other. One or a number of braces such as the brace 28 which is shown diagrammatically in FIG. 1 maintain the fuel pencils in correctly spaced relation.

In accordance with the invention, the fuel pencils 12 are suspended from a grid which is not flat but which is provided along the vertical mid-plane of the assembly with a transverse cross-section which is closely related to a paraboloid. Now, it is known that a parabola constitutes the equilibrium curve of a slack string which is subjected to a constant unitary load along the axis at right angles to the axis of symmetry of the curve. In point of fact, the support grid 14 does not correspond exactly to this condition on account of the distribution of the fuel pencils. Moreover, some fabrication processes cannot be readily adapted to the formation of a parabolic profile. In consequence, it often proves advisable not to employ a parabolic profile but to adopt a simpler shape such as a spherical dome, especially when the support grid has to be machined in the solid. In all cases, the grid 14 is rigidly fixed to the top retaining ring 18, for example by welding, in such a manner as to ensure that said retaining ring plays a part in affording resistance to tractive forces which are exerted in the direction of the axis.

The support grid which is shown in FIG. 2 is provided with a series of round-head rivets 30 each constituting one of the elements of a knuckle-joint connection between the grid and a fuel pencil 12. The other knuckle-joint connection element is constituted by a blind-end or acorn nut 32, the internally-threaded central bore of which has a rounded end 34. When the fuel pencil is in position, said rounded end bears on the head of the rivet 30. The nut 32 is split along generatrices in order to permit the insertion of corresponding arms of the grid around the rivet. A threaded stud 38 which forms an extension of the upper end plug 24 of the fuel pencil is screwed into the acorn nut 32. In order to prevent opening-out of the split portion of the nut 32 during the screwing operation, a ring 36 of suitable length is advantageously fitted round the stud prior to placing the nut in position.

In order to illustrate the mode of assembly of each fuel pencil, the central pencil is shown in FIG. 2 as being separated from its acorn nut 32. Said nut 32 is first placed on the corresponding rivet 30, whereupon the fuel pencil fitted with the ring 36 is moved upwards in order to screw the stud 38 into the acorn nut 32. On completion of this operation, a safety locking-pin 40 is inserted in order to prevent any accidental unlocking which may be caused, for example, by vibrations.

A number of different alternative forms are evidently possible. In the embodiment shown in FIG. 3, the support grid 14' is provided with bosses 30' which replace the rivets 30; this solution is particularly advantageous when the constituent material of the grid has mechanical characteristics such as to permit of shaping by die-stamping. In order to avoid the need to rotate the fuel pencils while they are being assembled on the grid, the end plugs 24' are accordingly provided with a tubular extension in which the slits for insertion of the grid arms are formed. The second knuckle-joint coupling element is constituted by a threaded stud 32' which is screwed into an internal thread formed in the split tubular extension of the end plug. In order to prevent the arms of this extension from opening out, provision is made for a covering ring 36'.

It should be noted that the retaining ring 18' is of small thickness over a portion of its length. Thus, in the event of accidental dropping of one fuel assembly onto another assembly located beneath, compression of the portion referred to has the effect of absorbing kinetic energy.

Whatever may be the mode of fabrication adopted for the support grid, the sag of the central portion with respect to the periphery is chosen in accordance with a compromise between two factors: an increase in sag corresponds to a reduction in strain (and permits a reduction in thickness) but, on the other hand, entails an increase both in the grid area and in the overall space requirements in the vertical direction. By way of example, in the case of a grid 160 millimeters in diameter which carries seven fuel pencils 1400 millimeters in length loaded with UO₂ pellets 13 millimeters in diameter, it is merely necessary to have a sag of 30 millimeters in order to permit a division of the weight of the grid by a factor of 7 to 8, whereas a more substantial projection would not result in any appreciable gain.

The advantage of the invention will appear from a comparison of a few numerical data. Whereas, in the case of a fuel assembly of the type hereinabove described, a flat grid fabricated from ATR (zirconium-base alloy containing copper and molybdenum) has a thickness of 30 millimeters and weighs approximately 1800 grams, this weight can be reduced to 220 grams in the case of a grid having a thickness of approximately 3 millimeters and a sag of 30 millimeters. By making use of stainless steel, this weight could be reduced still further without thereby reducing the neutron absorption to any significant extent by reason of the higher capture cross-section thus afforded.

In both of the embodiments illustrated in the drawings, the grid has a downward sag. This arrangement is usually preferable: in the event of sudden dropping of a fuel assembly which results in failure, the support grid of the assembly which is located directly beneath tends to bring the fuel pencils towards the center. In addition, the annular recess 20 is left clear. However, should the mechanical characteristics of the alloy from which the grid is formed make it preferable for this latter to work in compression under load (for example, if said alloy is subject to crack-forming oxidation in the coolant gas), the arrangement may in such a case be reversed so that the convexity of the support grid is directed upwards. The alloy is then in compression under load instead of being in tension. Of course, it would also be feasible to support the fuel pencils on a grid placed at the lower end of the fuel assembly instead of suspending them. In the majority of cases, however, the second solution mentioned above appears preferable.

In the form of construction which is illustrated, the fuel pencils are all of the same length. This solution is usually preferably for reasons of standardization and does not carry any disadvantage in view of the fact that, although the central fuel pencils project to a greater distance at the bottom, all the pencils of a given fuel assembly are nevertheless located at the same distance from those of the assembly which is located immediately beneath within the reactor channel (this assembly being shown in chain-dotted lines in FIG. 1).

It is wholly apparent that the arms of the support grid can be endowed with a transverse cross-section which is not rectangular but profiled in the direction of flow of the coolant. The pressure drop to which the coolant is subjected may thus be appreciably reduced. In fact, a profile which can be executed with relative ease at the time of fabrication by die-stamping makes it possible to reduce the pressure drop coefficient by one-half.

Depending on the alloy which is employed in the fabrication of the support grid, a number of fabrication processes can be contemplated: when the material is sufficiently drawable, or ductile, the support grid can be produced from a flat sheet by cutting, die-stamping and shaping. When the material is not capable of withstanding the necessary tensile stresses, the grid can be formed by electro-erosion or electrolytic machining, or any other suitable process.

It must be understood that the modifications referred to above and, broadly speaking, any alternative form of all or part of the arrangements described which come within the definition of equivalent means are covered by this patent.

What we claim is:

1. A nuclear fuel assembly for vertical-channel reactors comprising a bundle of canned fuel pencils, a grid for supporting one of the terminal portions of said fuel pencils, at least one brace for maintaining said fuel pencils in spaced relation, characterized in that the support grid having a shape of revolution having a generatrix which is substantially a parabola whose axis coincides with the axis of the fuel assembly.

2. A fuel assembly in accordance with claim 1, the support grid being at the top portion of the fuel element and the fuel pencils being suspended from the grid by knuckle-joint connections.

3. A fuel assembly in accordance with claim 2, each knuckle-joint connection being a hemispherical boss formed on the top face of the support grid and carrying a member removably fixed to the top end plug closing the can of the fuel pencil.

4. A fuel assembly in accordance with claim 2, said boss being constituted by the head of a rivet fixed to the support grid.

5. A fuel assembly in accordance with claim 2, said boss being constituted by a bulge in the support grid.

6. A fuel assembly in accordance with claim 3, said member consists of a threaded stud screwed into an internally-threaded bore in the split terminal portion of the end plug.

7. A fuel assembly in accordance with claim 3, said member being constituted by an acorn nut screwed onto a threaded terminal stud of the end plug and split along opposite generatrices for insertion of the support grid.

8. A fuel assembly in accordance with claim 7, including a ring placed around the split terminal portion of the acorn nut preventing said nut from opening out.

9. A fuel assembly in accordance with claim 1, said grid being rigidly fixed to a retaining ring resisting radial stresses transmitted by the grid to accommodate the weight of the fuel pencils.

10. A fuel assembly in accordance with claim 9, an annular recess being formed in the retaining ring for engagement of a fuel handling gripper in said recess.

11. A fuel assembly in accordance with claim 9, the retaining ring being of reduced thickness over a portion of its vertical development for deformation in the event of impact.

12. A fuel assembly in accordance with claim 1, the support grid resting on a sleeve of moderating material consisting of a plurality of longitudinal sections rigidly coupled by tie-rods joining the bottom section to the support grid.

References Cited
UNITED STATES PATENTS 3,240,681   3/1966   Waine et al. _____ 176—78

REUBEN EPSTEIN, *Primary Examiner.*

MELVIN J. SCOLNICK, *Assistant Examiner.*

U.S. Cl. X.R.

176—87